No. 857,506. PATENTED JUNE 18, 1907.
G. A. WIELAND.
BREAKWATER.
APPLICATION FILED OCT. 6, 1906.
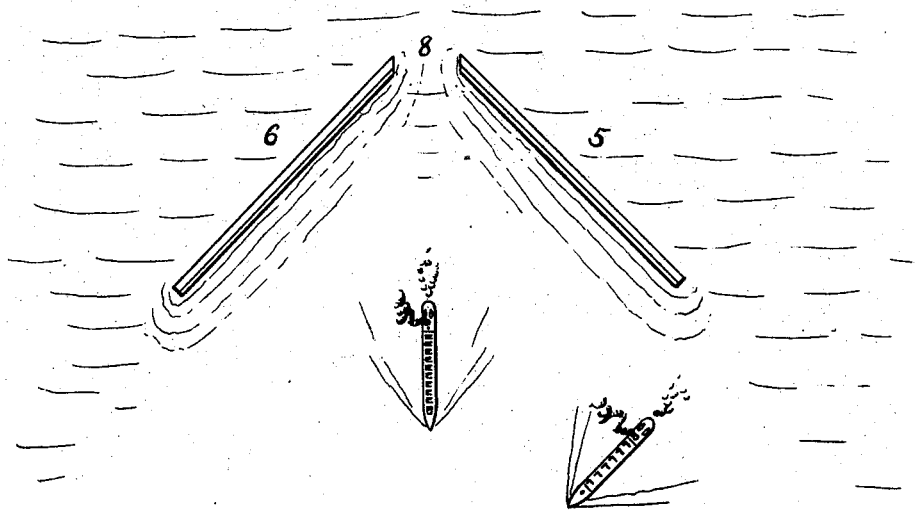
Fig-1-
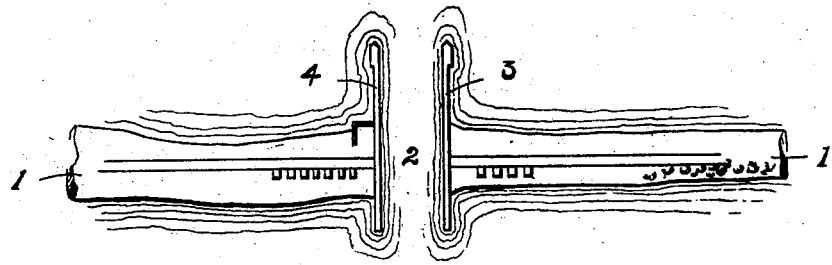
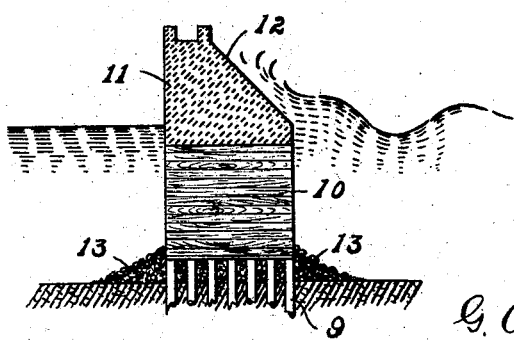
Fig-2-
WITNESSES:
C. R. Wright, Jr.
E. R. Peck
INVENTOR.
G. A. Wieland,
BY A. S. Pattison,
ATTORNEY.

UNITED STATES PATENT OFFICE.

GEORGE ALBERT WIELAND, OF DULUTH, MINNESOTA.

BREAKWATER.

No. 857,506.   Specification of Letters Patent.   Patented June 18, 1907.

Application filed October 6, 1906. Serial No. 337,822.

*To all whom it may concern:*

Be it known that I, GEORGE ALBERT WIELAND, a citizen of the United States, residing at Duluth, in the county of St. Louis and State of Minnesota, have invented certain new and useful Improvement in Breakwaters, of which the following is a specification, reference being had therein to the accompanying drawing.

My invention relates to improvements in breakwater, and pertains particularly to means for protecting canal entrances where they empty into a large body of water.

The object of my invention is to provide a breakwater of the character described, so arranged and constructed as to more fully accomplish the results herein stated.

In the accompanying drawings, Figure 1, is a plan view of a canal entrance emptying into a large body of water and showing my improved breakwater applied. Fig. 2, is an enlarged transverse vertical sectional view of the breakwater.

Referring now to the drawings, 1 represents a narrow strip of land through which a canal 2 has been cut, the canal being maintained by the usual piers 3 and 4 on either side thereof, this being a customary manner of making an opening for the entrance of vessels to canals. In canals of this character where they empty into large bodies of water, it frequently becomes dangerous for ships entering the same, as in case of a high wind blowing in the mouth of the canal, and a strong current running out, as this causes a very heavy and choppy sea at the mouth of the canal as a result, and through which the ships have to pass at a low rate of speed, which frequently results in accidents by the ship being tossed against the sides of the mouth of the canal. To overcome this I provide two obliquely-arranged piers 5 and 6 forming a breakwater, the said piers 5 and 6 forming a breakwater, the said piers being arranged some distance out in the water from the entrance to the canal to admit of a ship coming around from either side behind them and entering the canal. The two outer ends of the breakwater piers 5 and 6 are separated a suitable distance to have a space 8 to admit of a vessel entering directly between them, and said space 8 being in a line directly opposite the mouth of the canal 2, the vessel enters the canal in a straight line.

These breakwaters can be of any length desired, and arranged at any desired angle in respect to the shore, but are preferably arranged at an angle of forty-five degrees to the center line of the canal, as at this angle, in the event of a vessel in approaching the breakwater, unavoidably missing the entrance 8 between them and striking the pier, or sighting them just before striking, they will admit of the greatest latitude possible for the vessel shearing or glancing off without damage, and yet providing the protection to the canal entrance. By this arrangement it will be seen that inside of the breakwater is a comparatively smooth body of water, and the vessel running at slow speed can readily enter the canal.

The piers 5 and 6 are preferably constructed of a foundation of piling 9 driven into the bed of the body of water, and surmounted with a wooden pier construction 10 which extends up adjacent to the surface of the water. Carried by the pier construction is a cap of concrete 11 which extends considerably above the surface of the water and is provided with a sloping surface 12 which prevents the waves from having a pounding action against the breakwater. Around the piling and also the lower portion of the pier construction is a rip rap 13 which forms a more solid foundation for the breakwater. However, it is evident that any other form of construction might be adopted in carrying out my invention.

Having thus described my invention, what I claim and desire to secure by Letters Patent, is:—

1. The combination with a canal emptying into a large body of water, of a breakwater arranged opposite the canal a distance therefrom to allow a vessel to pass around the same and enter the canal, said breakwater formed in two sections arranged at substantially right angles to each other and at an angle to the canal, and said sections spaced a distance apart to allow a vessel to pass between the same and enter the canal.

2. The combination with a canal emptying into a large body of water, of a breakwater arranged opposite the canal a distance therefrom to allow a vessel to pass around the same and enter the canal, said breakwater formed in two sections and of a solid form from the bottom of the body of water to above the same, and having an oblique cap to divert the waves upwardly, said sections arranged at right angles to each other and at an angle to the canal and spaced a distance apart equal to the width of the canal to allow the vessel to pass between the sections and enter the canal.

In testimony whereof I affix my signature in presence of two witnesses.

GEORGE ALBERT WIELAND.

Witnesses:
  J. B. RICHARDS,
  M. DOUGLAS.